United States Patent Office 2,858,252
Patented Oct. 28, 1958

2,858,252

ENDOALKYLENE - TETRA - HYDROPHTHALIC ACID RESIN ENTERIC COATING COMPOSITIONS

Emil Lang, Riehen, and Peter Speiser, Neue-Welt, near Basel, Switzerland, assignors to Ciba Pharmaceutical Products Inc., Summit, N. J.

No Drawing. Application December 20, 1955
Serial No. 554,122

Claims priority, application Switzerland
December 24, 1954

7 Claims. (Cl. 167—82)

This invention relates to coating compositions. More particularly, it concerns compositions suitable for coating pills, tablets, granules, dragees and similar pharmaceutical preparations wherein it is intended that the active substance exerts its effect in the intestine only.

Medicine substances in which the active material is provided with a coating resistant to gastric juice are known. Such medicinal preparations are coated with a protective layer of natural resins, balsams, kerotins, salol, or also artificial resins, fatty acid esters or cellulose derivatives or mixtures thereof.

Exhaustive experiments have shown however that the protective agents hitherto used for this purpose, fulfil their object only to a limited extent for various reasons. Thus they may be formulated without taking sufficient account of the pH conditions in the gastro-intestinal tract so that the active material exerts its effect either too early, too late or not at all. The difficulties in coating with the layers resistant to the gastric juice may be of a technical nature, the layers being irregularly applied or giving rise to cracks; the coatings may undergo such ageing effects on prolonged storing that either their resistance to gastric juice is lost or they acquire resistance to intestinal juice.

The present invention is based on the observation that these disadvantages can be avoided when the active substance is provided with a solid, non-brittle lacquer coating which consists of an alkyd resin of an endoalkylene-tetra-hydrophthalic acid and a polyhydric especially a dihydric alcohol, a liquid, unsaturated, high molecular weight, fatty acid and shellac. As the specified fatty acids oleic acid is more especially suitable, but e. g. linoleic or linolenic acid is also useful. As alkyd resins preferably endomethylene or endoethylene tetrahydrophthalic acid glycol polyesters are used. They may also contain in the hydrophthalic acid residues substituents, for example alkyl radicals, such as methyl or isopropyl radicals. A quite particularly advantageous alkyd resin is that of 3-isopropyl-6-methyl-3:6-endoethylene-$\Delta^4$-tetrahydrophthalic acid and glycol.

The specified lacquer can contain the three components in a wide range of proportions so long as a solid, non-brittle coating is produced. Suitable mixture proportions are, for example 35–65% resin, 10–25% fatty acid and 25–40% shellac. An extraordinarily good resistance to gastric juice combined with an outstanding solubility in intestinal juice is exhibited by the lacquer mixture from about 50% of the alkyd resin of 3-isopropyl-6-methyl-3:6-endoethylene-$\Delta^4$-tetrahydrophthalic acid and glycol, about 17% of oleic acid (9-octadecene acid) and about 33% of shellac.

The new coating compositions may be applied to any form suitable for peroral administration, as for example pills, tablets, dragees granules, powders and the like. The active substance may be any suitable medicament which is active or adsorbable in the intestine.

The coating compositions of this invention being useful as carriers for medicinal substances, it can be readily seen that such final products will consist primarily of a nucleus of active substance surrounded by said lacquer coating, and can comprise a plurality of layers of medicament. It is thus possible to apply a second layer of active substance over the protective lacquer layer covering the first active substance. In this manner a preparation is produced comprising a proportion of an active substance which will exert its effect in the stomach before the action of the substance to be protected from the gastric juice. The two doses of medicament may consist of the same or different substances.

According to an other embodiment of the invention the new coating compositions may be applied to granules or powders of active substance. Such final products may be mixtures of granules and/or powders having coatings of the same or different thicknesses, which makes it possible to influence the active period. When an early onset of the action is desired there are advantageously used medicinal carriers consisting, in addition to the coated particles, of uncoated active substance, either in the form of powder, or granules, or of a coating around lacquered particles. The active substances so employed may be the same or different.

The coating compositions of this invention may be made up by conventional methods. Thus the lacquer mixture can be dissolved in a suitable solvent such as chloroform-alcohol and coated on by dipping of the active nucleus into the solution, by pouring the solution over the active material, by spraying or by coating by the customary methods used in the production of dragees. The rate of solubility in the intestine can be modified by the use of thicker coatings or a plurality of coatings, so that the activity of the medicament in the nucleus can be suitably timed. It is also possible to prolong the active period by giving some of the particles a lacquer coating of different thickness, to mix the thinly coated and the heavier coated particles with lacquer-free granulated or powdered active substance and to work up in the ordinary manner, for example to tablets. As an alternative to this method one can also enclose such mixtures in capsules or wafers which dissolve in the gastric juice.

Moreover, the effective time may be extended also by placing variously coated, for example cylindrical, tablets one on top of the other and coating the entire pile with a material which dissolves in gastric juice.

The following examples illustrate the invention:

Example 1

Moulded tablets having a content of active material consisting of 5 mg. of phenyl-cyclohexyl-hydroxy-acetic acid dimethylamino ethyl ester brommethylate, a diameter of 6 mm. and a gross weight of 80 mg. are treated in batches with a chloroform-containing alcoholic solution of 50% of the alkyd resin from 3-isopropyl-6-methyl-3:6-endoethylene-$\Delta^4$-tetrahydrophthalic acid and glycol, 17% of oleic acid (9-octadecene acid) and 33% of shellac, the solution being poured over the tablets and later sprayed in a coating vessel normally used for the production of dragees. Between the separate treatments with lacquer, the tablets must be dusted with small quantities of the usual powder to prevent their sticking together. The tablets are treated in batches with lacquer solution until the dried tablets have a gross weight of 105 mg., at which point it has been shown that the thickness of the lacquer layer amounts to $160\mu \pm 10\%$.

The lacquered tablets are then provided with an outer coating, as in the normal production of dragees, of a solution of gum arabic and sugar, up to a gross weight of 110 mg. The tablets are then further coated with a solution of the specified medicinal material and sugar in water which has been made up to a suspension with talc, the treatment being continued until each dragee contains in the outer coating a total of 5 mg. of phenyl-cyclohexyl-hydroxy acetic acid dimethylamino ethyl ester brommethylate. A final coating of sugar is provided.

With such a formulation, the medicament in the outer coating is liberated immediately after taking, whereas the medicament in the interior nucleus, which is protected by the layer of lacquer, is not liberated until about 2½–4 hours after passage of the pylorus, as can be proved as a result of X-ray examination of a number of individuals.

A similar result is obtained if, instead of the lacquer described, a lacquer consisting of 38% alkyd resin from 3-isopropyl-6-methyl-3:6-endoethylene - $\Delta^4$ - tetrahydrophthalic acid and 1:2-propandiol, 24% oleic acid and 38% shellac is used.

The moulded tablets used as starting material can be prepared in the following manner:

125 grams of phenyl-cyclohexyl-hydroxy-acetic acid diethylamino-ethanol ester brommethylate are mixed homogeneously with 850 grams of lactose and sieved. 25 grams of gelatin are dissolved in 200 cc. of water, 75 grams of wheat starch are added and the mixture is pasted. 550 grams of wheat starch are incorporated in the paste. The mixture is granulated through a sieve and the granulate dried. After adding 12.5 grams of magnesium stearate, 200 grams of arrowroot and 162.5 grams of talc, the mixture is worked up in the usual manner to moulded tablets having a diameter of 6 mm. and an average weight of 80 mg.

*Example 2*

Moulded tablets with a content of active material consisting of 250 mg. of $\alpha$-phenyl-$\alpha$-ethylglutaric acid imide, a diameter of 10 mm. and a gross weight of 335 mg., are lacquered in batches with a chloroform-containing alcoholic lacquer solution of the nature described in Example 1, by pouring over followed by spraying in a vessel normally used for the production of dragees. Between the individual lacquer coatings, the tablets must be dusted with small quantities of the usual powder to prevent their sticking together. The tablets are treated with lacquer solution until the dried tablet has a gross weight of 425 mg., at which point it has been shown that the thickness of the protective lacquer layer amounts to $200\mu \pm 10\%$.

The tablets are now further coated in the customary manner with a gum arabic-sugar-talc suspension to a gross weight of 545 mg. and finally provided with a coating of sugar. The medicament in the tablet nucleus protected by the lacquer which is resistant to gastric fluids, is not liberated until 2½–4 hours after passage of the pylorus, which can be proved by X-ray examination of a number of individuals.

*Example 3*

A certain quantity of sugar balls, so-called globules, having an average weight of 50 mg. are treated in a coating pan with an alcoholic solution of phenylcyclohexyl-hydroxy-acetic acid-dimethylamino-ethyl ester-bromomethylate in such manner that each globule takes up 0.25 mg. of that active substance. One fourth of the treated globules is removed and the remaining three-fourths coated with the lacquer mixture consisting of 50% alkyd resin from 3-isopropyl-6-methyl-3:6-endoethylene-$\Delta^4$-tetrahydrophthalic acid and glycol, 17% of linoleic acid (9:12-octadecadienic acid) and 33% of shellac, dissolved in alcohol and chloroform, until the homogeneous lacquer coatings after drying have a thickness of about $60\mu$ which suffices for a 30 minutes' resistance to artificial gastric juice. The second fourth of the globules is then removed and the remainder treated in analogous manner with gastric juice-resisting lacquer until the coating has an approximate thickness of $110\mu$. Such coating withstands artificial gastric juice for about one hour. The third fourth of the globules is removed from the pan and the last fourth lacquered in the usual manner to a coating thickness of about $160\mu$, sufficient for a resistance of about two hours to artificial gastric juice at 37° C.

The unlacquered globules and those with different coatings are placed in hard capsules or wafers of natural or hardened gelatine or starch, it being possible to meet specifications as to the relative proportions and as to the total quantity of active substance.

*Example 4*

With the aid of a sieve with punched holes a granulate is made in the usual manner from starch, gelatine lactose, $\alpha$-phenyl-$\alpha$-piperidyl-(2)-acetic acid ethyl esterhydrochloride and a small quantity of water. 10 grams of the dry granulate contain a total of 10 mg. of active substance. The dry granulate is divided into several portions which are treated with the gastric juice-resistant lacquer mixture described in Example 1 so as to acquire coatings of different thicknesses. One portion of the granulate is not coated with such lacquer, another is thinly coated, that is to say, 100 grams of granulate are treated with a lacquer solution in alcohol and chloroform containing a total of 7.5 g. of solid resin particles. The granulate so treated has a 30 minutes' resistance to artificial gastric juice at 37° C. Another portion of the granulate is given a thicker lacquer coating, that is to say, a total of 100 g. of granulate is coated with a lacquer solution in alcohol and chloroform with a total content of 12.5 g. of solid resin particles. The resistance of this portion is one hour at 37° C. Finally, a further portion of granulate is given a thick coating in that 100 grams of it are treated with a lacquer solution in alcohol and chloroform and 18 g. of solid resin particles. Its resistance to artificial gastric juice at 37° C. lasts about four hours. The various portions are then mixed and filled into capsules or other container according to specifications as to relative proportions and total content of active substance.

Analogous mixtures of granulates are obtained if, instead of the lacquer described, a lacquer is used consisting of 55% alkyd resin from 3-isopropyl-6-methyl-3,6-endoethylene-$\Delta^4$-tetrahydrophthalic acid and glycerin, 16.7% linolenic acid and 28.3% shellac.

*Example 5*

As described in Example 1, a tabletting granulate is prepared in the usual manner. One portion of it is treated with a chloroform-containing alcoholic solution of 45% of the alkyd resin from 3:6-endomethylene-$\Delta^4$-tetrahydrophthalic acid and glycol, 15% of oleic acid and 40% of shellac, the thickness of the coating being adapted to specifications as to decomposition in the stomach and intestine. The coated granules are then mixed with the auxiliary substances required for tabletting, such as lubricant, filling material, swelling agent etc. A multi-layer tablet is then prepared. The granulates from which these tablets are made may contain the same or different active substances and one layer of the tablet advantageously contains a heavily coated granulate, another a thinly coated granulate, and still another a granulate not coated with the lacquer of this invention.

Instead of the lacquer described in this example a lacquer consisting of 60% alkyd resin from 3-isopropyl-6-methyl-3:6-endoethylene-$\Delta^4$-tetrahydrophthalic acid and glycol, 10% oleic acid and 30% shellac may also be used.

*Example 6*

1 kilo of active substance, for example 2-(N-phenyl-N-benzyl-aminomethyl)-imidazoline-hydrochloride, is homogeneously mixed with 3 kilos of lactose, and ⅘ of the mixture are spread out in a thin layer. With a spray gun 100 grams of the lacquer solution described in Example 1 and diluted with 250 cc. of alcohol are sprayed on to the mixture, the latter being turned frequently. The mixture is then dried in vacuo or in a rotating drying oven at 40–50° C. and any cohesive material is crushed again with the aid of an impact mill or rod mill. The powder is treated with lacquer as described above, ⅓ of the already lacquered powder being removed until resistance times in artificial gastric juice of about 30 minutes, 1 and 2 hours, and in artificial intestinal juice of about 2 hours have been obtained.

By suitably mixing non-lacquered powder, weakly lacquered powder and strongly lacquered powder, the active substance is adsorbed partly immediately, partly in the stomach and partly only in the intestine when such a powder is administered.

The mixed, unlacquered powders and those varying in the degree of lacquer are divided into tablets or capsules. They can however be worked up in the usual manner into a granulate or moulded to form tablets or dragees.

What is claimed is:

1. A pharmaceutical preparation containing a gastric juice-resistant coating, the said coating comprising a mixture of about 35 to 65% of an alkyd resin of endoalkylene-tetrahydrophthalic acid and lower alkyl-substituted derivatives thereof and a dihydric alcohol, about 10 to 25% of a liquid, unsaturated fatty acid of high molecular weight, and about 25 to 40% of shellac.

2. A pharmaceutical preparation containing a gastric juice-resistant coating, the said coating comprising a mixture of about 35 to 65% of an alkyd resin of endoalkylene-tetrahydrophthalic acid and lower alkyl-substituted derivatives thereof and a dihydric alcohol, about 10 to 25% of oleic acid and about 25 to 40% of shellac.

3. A pharmaceutical preparation containing a gastric juice-resistant coating, the said coating comprising a mixture of from about 35% to about 65% of an alkyd resin of endoalkylene-tetrahydrophthalic acid and lower alkyl-substituted derivatives thereof and a polyhydric alcohol, from about 10% to about 25% of a liquid unsaturated fatty acid of high molecular weight, and from about 25% to 40% of shellac.

4. A pharmaceutical preparation containing a gastric juice-resistant coating, the said coating comprising a mixture of about 50% of an alkyd resin of 3-isopropyl-6-methyl-3:6-endoethylene-$\Delta^4$-tetrahydrophthalic acid and glycol, about 17% of oleic acid and about 33% of shellac.

5. A solid therapeutic composition of matter for oral administration consisting of a core containing phenyl-cyclohexyl-hydroxyacetic acid dimethylamino ethanol ester brommethylate coated with a lacquer comprising a mixture of from about 35% to about 65% of an alkyd resin of endoalkylene-tetrahydrophthalic acid and lower alkyl-substituted derivatives thereof and a polyhydric alcohol, from about 10% to about 25% of a liquid unsaturated fatty acid of high molecular weight, and from about 25% to 40% of shellac.

6. A solid therapeutic composition of matter for oral administration consisting of a core containing phenyl-cyclohexyl - hydroxy - acetic acid dimethylaminoethanol ester brommethylate coated with a lacquer comprising a mixture of about 50% of an alkyd resin of 3-isopropyl-6-methyl-3:6-endoethylene-$\Delta^4$-tetrahydrophthalic acid and glycol, about 17% oleic acid and about 33% of shellac.

7. A solid therapeutic composition of matter for oral administration consisting of a core containing phenyl-cyclohexyl - hydroxy - acetic acid dimethylaminoethanol ester brommethylate coated with a lacquer comprising a mixture of about 50% of an alkyd resin of 3-isopropyl-6-methyl-3:6-endoethylene-$\Delta^4$-tetrahydrophthalic acid and glycol, about 17% oleic acid and about 33% of shellac and having an outer shell containing phenyl-cyclohexyl-hydroxy-acetic acid dimethylaminoethanol ester brommethylate.

References Cited in the file of this patent

UNITED STATES PATENTS

| | | |
|---|---|---|
| 2,071,511 | Eldred | Feb. 23, 1937 |
| 2,144,464 | Sachs | Jan. 17, 1939 |
| 2,205,111 | Volwiler | June 18, 1940 |

OTHER REFERENCES

Clarkson: Tablet Coating, publ. by Drug and Cos. Ind., N. Y., 1951, p. 61.